US009281741B2

(12) United States Patent
Weng

(10) Patent No.: US 9,281,741 B2
(45) Date of Patent: Mar. 8, 2016

(54) START-UP CIRCUIT FOR VOLTAGE REGULATION CIRCUIT

(71) Applicant: Taiwan Semiconductor Manufacturing Company Limited, Hsin-Chu (TW)

(72) Inventor: Chi-Hsiang Weng, Hsinchu (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 176 days.

(21) Appl. No.: 13/795,494

(22) Filed: Mar. 12, 2013

(65) Prior Publication Data

US 2014/0266087 A1 Sep. 18, 2014

(51) Int. Cl.
| | |
|---|---|
| G05F 1/00 | (2006.01) |
| H02H 7/00 | (2006.01) |
| H02M 1/36 | (2007.01) |
| H02M 3/156 | (2006.01) |
| H02J 1/06 | (2006.01) |
| H02M 1/32 | (2007.01) |

(52) U.S. Cl.
CPC .. *H02M 1/36* (2013.01); *H02J 1/06* (2013.01); *H02M 3/156* (2013.01); *H02M 2001/322* (2013.01)

(58) Field of Classification Search
USPC ......... 323/246, 265, 270, 271, 274, 275, 282, 323/284, 285, 289, 901; 361/18
See application file for complete search history.

(56) References Cited

U.S. PATENT DOCUMENTS

| | | | | |
|---|---|---|---|---|
| 7,863,883 | B2* | 1/2011 | Jurasek et al. | 323/313 |
| 7,919,954 | B1* | 4/2011 | Mannama et al. | 323/272 |
| 8,026,703 | B1 | 9/2011 | Damaraju et al. | |
| 2002/0130646 | A1* | 9/2002 | Zadeh | G05F 1/575 |
| | | | | 323/275 |
| 2005/0194953 | A1 | 9/2005 | Chang et al. | |
| 2007/0052400 | A1* | 3/2007 | Chilcote | 323/283 |
| 2007/0096702 | A1* | 5/2007 | Rasmus | 323/281 |
| 2007/0241735 | A1* | 10/2007 | Rabeyrin et al. | 323/313 |
| 2008/0030177 | A1* | 2/2008 | Chen | G05F 1/46 |
| | | | | 323/282 |
| 2009/0033310 | A1* | 2/2009 | Erbito, Jr. | 323/313 |
| 2009/0296509 | A1 | 12/2009 | Chen | |
| 2009/0309562 | A1* | 12/2009 | Lipcsei et al. | 323/282 |
| 2011/0273153 | A1* | 11/2011 | Lepper | H02P 7/29 |
| | | | | 323/282 |
| 2012/0013317 | A1 | 1/2012 | Morino | |

OTHER PUBLICATIONS

Taiwan Office action dated Jun. 10, 2015, 8 pages.

* cited by examiner

*Primary Examiner* — Adolf Berhane
*Assistant Examiner* — Gary Nash
(74) *Attorney, Agent, or Firm* — Cooper Legal Group, LLC

(57) ABSTRACT

Among other things, techniques and systems are provided to pre-charge a node of a primary circuit, such as a voltage regulator or bandgap voltage reference, via a start-up circuit. The node is charged to a specified voltage during a pre-charge operation that occurs while the primary-circuit is powered-off. The pre-charge operation comprises discharging a voltage from the node during a first portion of the pre-charge operation and re-charging the node to the specified voltage during a second portion of the pre-charge operation. In some embodiments, the specified voltage is substantially equivalent to a switching voltage of a drive transistor of the primary circuit.

20 Claims, 9 Drawing Sheets

START-UP CIRCUIT FOR VOLTAGE REGULATION CIRCUIT

BACKGROUND

Voltage regulators and bandgap voltage references are circuits that are configured to output a stable, regulated output voltage to other electrical components. Such circuits are commonly found in power supply circuitry of various electronic devices, such as personal computers and cellular phones. Such circuits are also commonly found in memory circuitry.

SUMMARY

This summary is provided to introduce a selection of concepts in a simplified form that are further described below in the detailed description. This summary is not intended to be an extensive overview of the claimed subject matter, identify key factors or essential features of the claimed subject matter, nor is it intended to be used to limit the scope of the claimed subject matter.

According to some embodiments, systems and techniques for preparing a primary circuit to power-on are provided. Example primary circuitry includes voltage regulators, bandgap voltage references, or other circuitry configured to output a regulated voltage. A start-up circuit is operably coupled to a node of the primary circuit, and is configured to charge the node to a specified voltage prior to the primary circuit powering-on. In some embodiments, the specified voltage is substantially equal to a voltage that activates or turns-on a drive transistor of the primary circuit to regulate a voltage output by the primary circuit.

In some embodiments, the start-up circuit comprises a plurality transistors, such as metal-oxide semiconductor field-effect transistors (MOSFETs), configured to perform a pre-charge operation on the node to charge the node to the specified voltage prior to the primary circuit powering-on. During a first portion of the pre-charge operation, the start-up circuit is configured to discharge the node by activating a first transistor of the start-up circuit, which is coupled to ground or to a first voltage source. During a second portion of the pre-charge operation, the start-up circuit is configured to recharge the node to the specified voltage by activating a second transistor of the start-up circuit, which is coupled to a second voltage source.

In some embodiments, the primary circuit further comprises a switching element, such as a complementary metal-oxide semiconductor (CMOS) transmission gate, configured to electrically isolate the node from the drive transistor of the primary circuit while the node is being discharge and recharged.

The following description and annexed drawings set forth certain illustrative aspects and implementations. These are indicative of but a few of the various ways in which one or more aspects are employed. Other aspects, advantages, and novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. It will be appreciated that elements and structures of the drawings are not necessarily be drawn to scale. Accordingly, the dimensions of the various features is arbitrarily increased or reduced for clarity of discussion.

DETAILED DESCRIPTION

Figure 1:
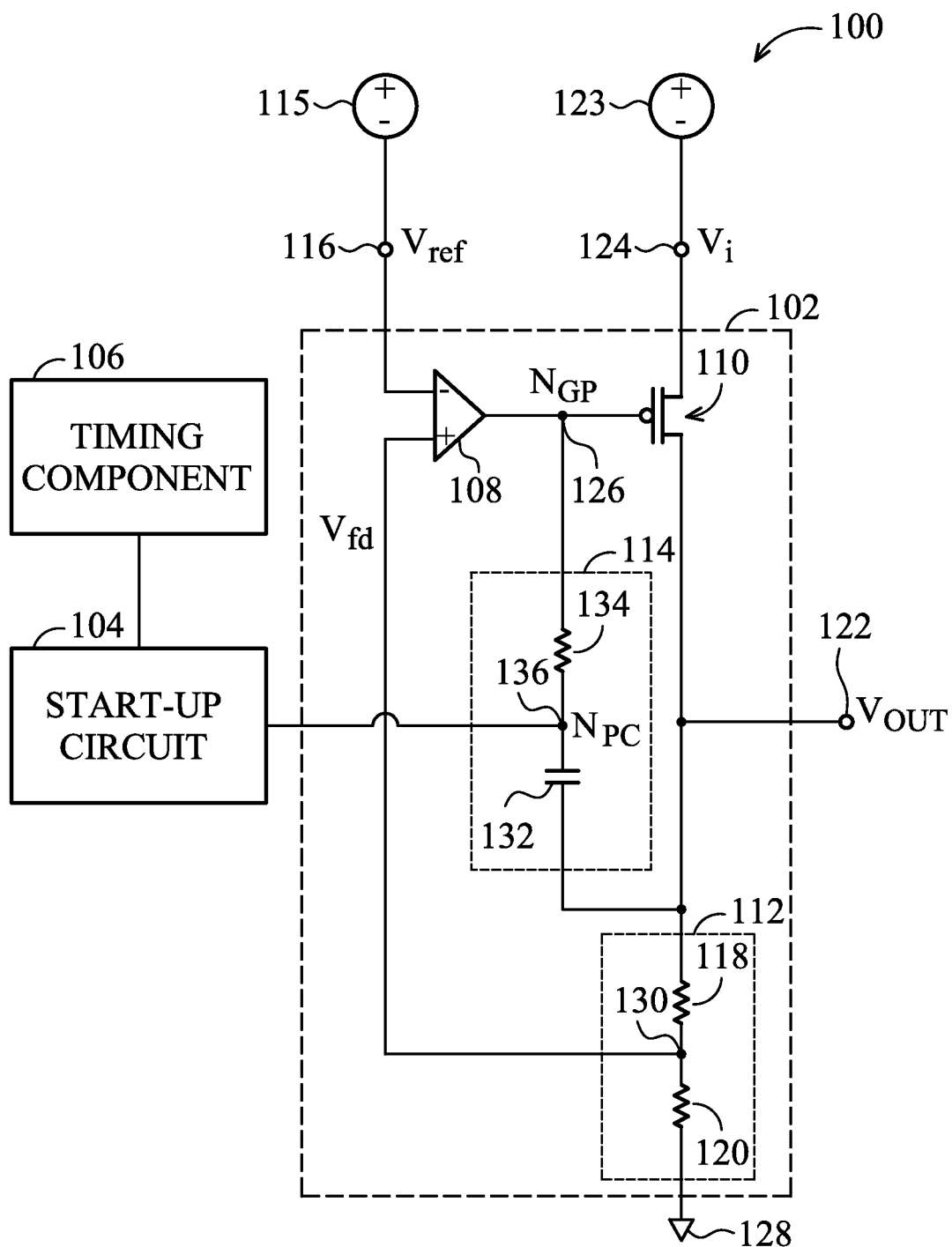
FIG. 1 is a diagram illustrating an example system for regulating a voltage applied to a load.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Voltage regulators and other circuitry configured to output a regulated voltage are often used in power supply circuitry and memory circuitry to regulate a voltage applied to a load. Such circuitry is referred to herein as primary circuitry, a primary circuit, or the like. In some embodiments, it is desirable to, at times, reduce power consumed by a device which includes the primary circuit. For example, in portable electronic devices powered via a battery supply, it is, at times, desirable to place the device in a standby or sleep-mode, which reduces or removes power from some electronic components, such as the primary circuit, to prolong battery life.

When the device is in standby or sleep-mode, the primary circuit is, at times, powered-off to reduce power consumption by the device. In such a state, the primary circuit pulls little to no power from a power supply, for example. When the device is to resume activity, the primary circuit is powered-on to regulate voltage output, causing the primary circuit to pull additional power from a power supply.

When the primary circuit transitions from a power-off state to a power-on state, the primary circuit experiences a wake-up time during which the primary circuit is not regulating the voltage output from the primary circuit. The wake-up time is generally the amount of time it takes for the primary circuit to come up to full power following a power-off state. One contributing factor to the wake-up time is the time it takes to charge a capacitor of the primary circuit.

Accordingly, as provided herein, systems and techniques for reducing a wake-up time of a primary circuit are provided. A start-up circuit is coupled to the primary circuit and is configured to perform a pre-charge operation on a node of the primary circuit to charge the node to a specified voltage prior to the primary circuit being powered-on. In some embodiments, the specified voltage is approximately equal to a voltage configured to activate or turn-on a drive transistor of the primary circuit to facilitate voltage regulation. In this way, by charging the node of the primary circuit to the specified voltage prior to the primary circuit being powered-on, the wake-up time of the primary circuit is reduced due to the capacitor becoming charged or discharged to a specified threshold more quickly, for example.

In some of the following embodiments, one or more of the referenced transistors function or operate as a switch. In such embodiments, a transistor that is activated or turned-on operates as a closed switch, such as to conduct current, for example, and a transistor that is inactive, deactivated, or turned-off operates as an open switch, such as to not conduct current, for example. Moreover, in some embodiments, it is possible to substitute the transistor with other electrical switches, such as gate turnoff thyristors (GTOs), integrated gate-commutated thyristors (IGCTs), bidirectional triode thyristors (TRIACs), complementary metal-oxide semiconductor (CMOS) transmission gates, etc.

FIG. 1 illustrates an example system 100 configured to output a regulated voltage. The system 100 comprises a primary circuit 102, a start-up circuit 104, and a timing component 106. In the example embodiment, the primary circuit 102 is configured as a voltage regulator. In other embodiments, the primary circuit 102 is configured as a bandgap voltage reference. In still other embodiments, one or more components of the primary circuit 102 are arranged to form other circuitry configured for regulating output voltage.

The primary circuit 102 comprises an operational amplifier 108 (op-amp), a drive transistor 110, a voltage divider 112, and a resistor-capacitor (RC) circuit 114.

In the illustrated embodiment, the operational amplifier 108 is a two-input operation amplifier. A negative input terminal of the operational amplifier 108 is coupled to a first voltage source 115 configured to apply a reference voltage ($V_{ref}$) to the negative input terminal via a first input terminal 116 of the primary circuit 102. A positive input terminal of the operational amplifier 108 is coupled to the voltage divider 112 configured to apply a feedback voltage ($V_{fb}$) to the positive input terminal. The feedback voltage, which is generated by the voltage divider 112, is substantially proportional to an output voltage ($V_{out}$) applied to an output terminal 122 of the primary circuit 102. Although the illustrated embodiment provides for a two-input operational amplifier, in other embodiments the operational amplifier 108 comprises more than two inputs. Moreover, in some embodiments, the negative input terminal of the operational amplifier 108 is coupled to the voltage divider 112 and the positive input terminal is coupled to the first voltage source 115.

The operational amplifier 108 further comprises an output terminal, which is coupled to the drive transistor 110. In some embodiments, the output terminal of the operational amplifier 108 is coupled to a gate of the drive transistor 110, and a signal output from the operation amplifier 108, referred to as a gate signal, is configured to control operation of the drive transistor 110 to turn-on and turn-off the drive transistor 110. A node 126 formed between the output terminal of the operational amplifier 108 and the drive transistor 110 is referred to as a gate-point node ($N_{GP}$).

The drive transistor 110 is further coupled to a second input terminal 124 of the primary circuit 102 and the output terminal 122 of the primary circuit 102. In some embodiments, a source of the drive transistor 110 is coupled to the second input terminal 124 and a drain of the drive transistor 110 is coupled to the output terminal 122. In other embodiments, the drain of the drive transistor 110 is coupled to the second input terminal 124 and the source of the drive transistor 110 is coupled to the output terminal 122. The second input terminal 124 is coupled to a second voltage source 123 configured to apply an input voltage to the drive transistor 110 via a voltage signal ($V_i$). In some embodiments, the drive transistor 110 is a p-type transistor, such as a p-type metal-oxide semiconductor field-effect transistor (pMOSFET). In other embodiments, the drive transistor 110 comprises an insulated gate bipolar transistor (IGBT), a bipolar junction transistor (BJT), a field-effect transistor (FET), or an n-type metal-oxide semiconductor field-effect transistor (nMOSFET), for example.

In the illustrated embodiment, the voltage divider 112 comprises a first resistor 118 and a second resistor 120 coupled in series between the output terminal 122 of the primary circuit 102 and ground 128 to form a resistive divider. A feedback node 130 is formed between the first resistor 118 and the second resistor 120, and the feedback voltage applied to the positive input terminal of the operational amplifier 108 is generated at the feedback node 130. In other embodiments, the voltage divider 112 comprises more than two resistors.

The RC circuit 114 of the example primary circuit 102 comprises a capacitor 132 and a resistor 134 coupled in series between the output terminal 122 of the primary circuit 102 and the gate-point node 126. A node 136 is formed between the capacitor 132 and the resistor 134 and is referred to as a pre-charge node ($N_{PC}$).

When the primary circuit 102 is fully powered-on, the drive transistor 110, which for purposes of this example is a pMOSFET, is configured to conduct an electrical current between the source and the drain of the drive transistor 110 based upon a voltage potential between the gate and the source of the drive transistor 110 to generate an output voltage that is applied to the output terminal 122 of the primary circuit 102. The voltage divider 112 is configured to generate a feedback voltage at the feedback node 130 that is proportional to the output voltage applied to the output terminal 122 of the primary circuit 102. The feedback voltage is compared to the reference voltage by the operational amplifier 108, which is configured to generate a gate signal, associated with a gate voltage, based upon a difference between the feedback voltage and the reference voltage. In some embodiments, the operational amplifier 108 is further configured to amplify such a difference when represented in the gate signal. The gate voltage is applied to the gate of the drive transistor 110 to control operation of the drive transistor 110, thereby regulating the output voltage applied to the output terminal 112.

When the primary circuit 102 is powered-off, the gate voltage applied to the drive transistor 110 is configured to turn-off the drive transistor 110 or maintain the drive transistor 110 in a turned-off state. In some embodiments, the primary circuit 102 is turned-off by reducing an input voltage applied to the drive transistor 110.

As will be described in more detail with respect to FIGS. 2-7, the start-up circuit 104 is configured to perform a pre-charge operation on the primary circuit 102, or more particularly on the pre-charge node 136 to which the start-up circuit 104 is coupled, while the primary circuit 102 is powered-off. For example, the start-up circuit 104 is configured to perform the pre-charge operation on the primary circuit 102 when an indication to power-on the primary circuit 102 is received. The pre-charge operation comprises discharging or resetting the pre-charge node 136 during a first portion of the pre-charge operation and recharging the pre-charge node 136 during a second portion of the pre-charge operation.

Recharging the pre-charge node 136 comprises applying a voltage to the pre-charge node 136 to charge the pre-charge node 136 to a specified voltage. The specified voltage is configured to decrease the time that it takes for the capacitor 132 to charge, thus decreasing the wake-up time when the primary circuit 102 is powered-on. In some embodiments, the voltage applied to the pre-charge node 136 effectively pre-charges the node to reduce the degree to which the capacitor 132 is required to be charged or discharged prior to primary circuit 102 regulating the output voltage via the drive transistor 110.

In some embodiments, the specified voltage is substantially equal to a switching threshold that causes the drive transistor 110 to switch from being turned-off to being turned-on. By way of example, in some embodiments where the drive transistor 110 is a p-type transistor, the switching threshold is substantially equal to the input voltage minus a threshold voltage ($V_{th1}$) of the drive transistor 110. For example, in some instances, the input voltage is approximately 3.3 V and the threshold voltage is approximately 0.7 V. Accordingly, in such instances, the switching voltage is approximately 2.6 V, and the pre-charge node 136 is therefore charged by the start-up circuit 104 to approximately 2.6 V.

A timing component 106, which in some embodiments is coupled to a controller (not shown) configured to control the powering-on and powering-off of the primary circuit 102, is configured to provide timing signals to the start-up circuit 106 to facilitate performing the pre-charge operation. In some embodiments, the timing signals are used to control the operation of one or more switching elements comprised within the start-up circuit 104, such as IGBTs, BJTs, FETs, MOSFETs, GTOs, IGCTs, TRIACs, CMOS transmission gates, etc.

Figure 2:
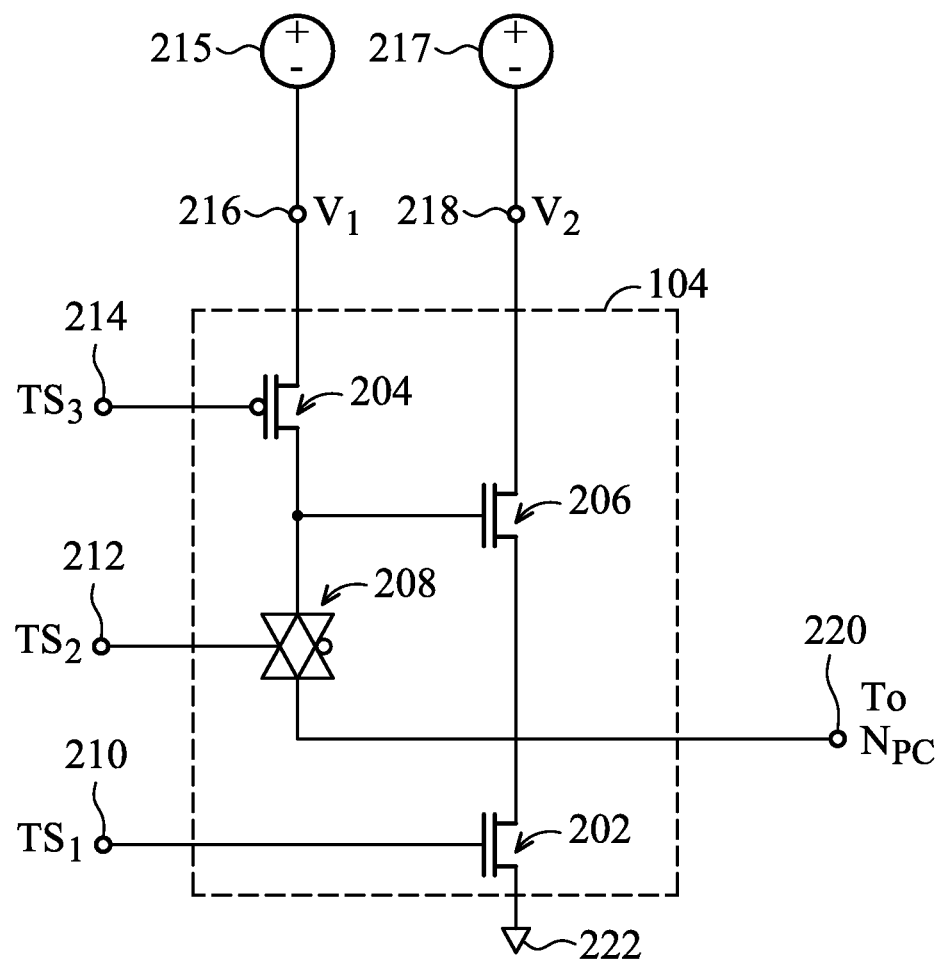
FIG. 2 is a diagram illustrating an example start-up circuit.

FIG. 2 illustrates a schematic diagram of an example start-up circuit 104 configured to perform a pre-charge operation on a portion of a primary circuit 102, such as on a pre-charge node 136 of the primary circuit 102. Again, it is to be appreciated that the illustrated arrangement is merely an example arrangement and other arrangements configured to perform the pre-charge operation or portions thereof, such as the discharge/reset of the pre-charge node 136 or recharge of the pre-charge node 136 to a specified voltage, are also contemplated. It will also be appreciated that for purposes of clarity, respective electrical elements are given a unique name intended to assist in identifying the electrical element being referenced. For example, a first transistor 202 is referred to as a reset transistor and a second transistor 204 is referred to as a control transistor to distinguish the first transistor 202 from the second transistor 204. Such names are not intended to be limiting, but rather are merely intended to be used as a unique identifier.

In the illustrated embodiment, the start-up circuit 104 comprises a first transistor 202, referred to as a reset transistor, a second transistor 204, referred to as a control transistor, and a third transistor 206, referred to as a recharge transistor. The start-up circuit 104 further comprises a switching element 208, such as a CMOS transmission gate.

The reset transistor 202 is coupled to a timing component 106 via a first input terminal 210 and is coupled to the pre-charge node 136 via a first output terminal 220. The reset transistor 202 is further coupled to ground 222 and is configured to, at times, electrically couple the pre-charge node 136 to ground 222 to discharge voltage that has accumulated at the pre-charge node 136. In this way, a voltage of the pre-charge node 136 is reset. In other embodiments, the ground 222 may be replaced with a voltage source configured to discharge or reset the pre-charge node 136. In some embodiments, the reset transistor 202 is an n-type transistor, such as an nMOSFET. In such embodiments, a source of the reset transistor 202 is typically coupled to ground 222 and a drain of the reset transistor 202 is typically coupled to the first output terminal 220. In other embodiments, the reset transistor 202 comprises an IGBT, a BJT, an FET, or a pMOSFET, for example.

The first input terminal 210 of the start-up circuit 104 is typically coupled to a gate of the reset transistor 202 to provide the timing component 106 with control over the activation and de-activation of the reset transistor 202. By way of example, when the timing component 106 applies a first voltage to the gate via a first timing signal ($TS_1$), the reset transistor 202 is configured to activate or turn-on, causing the pre-charge node 136 to be discharged to ground 222 or to a voltage source. When the timing component 106 applies a second voltage to the gate via the first timing signal ($TS_1$), the reset transistor 202 is configured to turn-off, causing the pre-charge node 136 to be electrically isolated from ground 222 or from a voltage source which replaced ground 222.

The control transistor 204 is coupled to a second input terminal 216 and to a gate of the recharge transistor 206 and is configured to, at times, control operation of the recharge transistor 206. In some embodiments, the control transistor 204 is a p-type transistor, such as a pMOSFET. Accordingly, in such embodiments, a source of the control transistor 204 is coupled to the second input terminal 216 and a drain of the control transistor 204 is coupled to the gate of the recharge transistor 206. In other embodiments, the control transistor 204 comprises an IGBT, a BJT, an FET, or an nMOSFET, for example.

The second input terminal 216 is coupled to a third voltage source 215 configured to apply a first voltage ($V_1$) to the control transistor 204. When the control transistor 204 is turned-on, the first voltage ($V_1$) is applied to the recharge transistor 206 by the control transistor 204 to turn-off the recharge transistor 206 or to maintain the recharge transistor 206 in a turned-off state. In some embodiments, the first voltage ($V_1$) is substantially equal to the input voltage ($V_i$) applied to the drive transistor 110 when the primary circuit 102 is powered-on. In other embodiments, the third voltage source 215 is the same voltage source as the second voltage source 123 configured to supply the input voltage signal ($V_i$) to the primary circuit.

A gate of the control transistor 204 is coupled to a third input terminal 214, which is coupled to the timing component 106, to provide for control of the control transistor 204 by the timing component 106. By way of example, when the timing component 106 applies a first voltage to the gate via a third timing signal ($TS_3$), the control transistor 204 is configured to turn-on, causing a voltage to be applied to the gate of the recharge transistor 206 by the control transistor 204. When the timing component 106 applies a second voltage to the gate via the third timing signal ($TS_3$), the control transistor 206 is turned-off to inhibit a voltage from being applied to the gate of the recharge transistor 206 by the control transistor 204.

The recharge transistor 206 is further coupled to a fourth input terminal 218 and to the first output terminal 220. In some embodiments, the recharge transistor 206 is a p-type transistor, such as a pMOSFET. Accordingly, a source of the recharge transistor 206 is coupled to the fourth input terminal 218 and a drain of the recharge transistor 206 is coupled to the first output terminal 220. In other embodiments, the recharge transistor 206 comprises an IGBT, a BJT, an FET, or an nMOSFET, for example.

The fourth input terminal 218 is coupled to a fourth voltage source 217 configured to apply a second voltage ($V_2$) to the recharge transistor 206. When the recharge transistor 206 is turned-on, a specified voltage is applied to the output terminal 220, which causes the pre-charge node 136 to recharge. In some embodiments, the specified voltage is substantially equal to a second voltage ($V_2$) minus a threshold voltage ($V_{th2}$) of the recharge transistor 206.

In some embodiments, the second voltage ($V_2$) applied to the recharge transistor 206 is substantially equal to the input voltage ($V_i$) applied to the drive transistor 110, and the recharge transistor 206 is configured similarly to the drive transistor 110 such that the recharge transistor 206 and drive transistor 110 have a substantially same threshold voltage. In this way, the specified voltage applied to the pre-charge node 136 is substantially equal to a switching threshold that triggers that drive transistor 110 to turn-on. In other embodiments, the recharge transistor 206 is configured differently than the drive transistor 110, and the second voltage ($V_2$) is set as a function of the threshold voltage ($V_{th2}$) of the recharge transistor 206 to cause the specified voltage to substantially equal a switching threshold of the drive transistor 110.

In some embodiments, the second voltage source 123 and the fourth voltage source 217 are a same voltage source. In other embodiments, the third voltage source 215 and the fourth voltage source 217 are a same voltage source. In still other embodiments, the second voltage source 123, third voltage source 215, and fourth voltage source 217 are a same voltage source.

The switching element 208 is coupled to the timing component 106 via a fifth input terminal 212. The switching element 208 is also coupled to the pre-charge node 136 via the first output terminal 220 and to the recharge transistor 206. As will be better understood with respect to FIGS. 3-7, the switching element 208 is configured to facilitate turning-off the recharge transistor 206 upon the pre-charge node 136 being recharged to the specified voltage. By way of example, in some instances, the switching element 208 is coupled to the gate of the recharge transistor 206 and is configured to turn-on when the control transistor 204 turns-off to electrically couple the pre-charge node 136 to the recharge transistor 206. In this way, a voltage applied to the pre-charge node 136 controls activation and deactivation of the recharge transistor 206 when the control transistor 204 is not actively controlling the recharge transistor 206, for example.

In some embodiments, the switching element 208 comprises a CMOS transmission gate. In other embodiments, the switching element 208 comprises an IGBT, a BJT, an FET, a MOSFET, a GTO, an IGCT, or a TRIAC, for example.

The switching element 208 is controlled based upon a second timing signal ($TS_2$) emitted by the timing component 106. In some embodiments, the second timing signal ($TS_2$) and the third timing signal ($TS_3$) are equivalent or the same timing signal. Moreover, in some embodiments, the switching element 208 is configured to operate in a manner that is opposite of the control transistor 204. By way of example, when the third timing signal ($TS_3$) applies a first voltage to the control transistor 204 and the second timing signal ($TS_2$) applies the first voltage to the switching element 208, the control transistor 204 is configured to turn-on and the switching element 208 is configured to turn-off. When the third timing signal ($TS_3$) applies a second voltage to the control transistor 204 and the second timing signal ($TS_2$) applies the second voltage to the switching element 208, the control transistor 204 is configured to turn-off and the switching element 208 is configured to turn-on.

With reference to FIGS. 3-7, an example operational flow of a start-up circuit 104 and a primary circuit 102 are described in greater detail. In this example, the control transistor 204, the recharge transistor 206, and the drive transistor 110 are p-type transistors, such as pMOSFETs, and the reset transistor 202 is an n-type transistor, such as an nMOSFET. Moreover, a same timing signal ($TS_2$) is supplied to the switching element 208 and the control transistor 204, and a same input voltage ($V_i$) is applied to the drive transistor 110, the control transistor 204, and the recharge transistor 206. For purposes of clarity, components that are turned-on or activated at respective periods during the operational flow are bolded in FIGS. 3-7.

It is to be appreciated that in FIGS. 3-7, a switching element 304 has been added to the primary circuit 102. The switching element 304 is configured to, at times, electrically isolate the pre-charge node 136 from the gate-point node 126. In some embodiments, the switching element 304 is coupled to the timing component 106 via a third input terminal 306 of the primary circuit 102 and is configured to activate and deactivate based upon a voltage applied to the switching element 304 via a fourth timing signal ($TS_4$) emitted by the timing component 106. In some embodiments, the switching element 304 is a CMOS transmission gate. In other embodiments, the switching element 304 comprises an IGBT, a BJT, an FET, a MOSFET, a GTO, an IGCT, or a TRIAC, for example.

Further, a timing diagram 302 is provided in respective FIGS. 3-7 and is intended to illustrate a state of respective timing signals during an interval of time being described in that particular figure. A first timing signal ($TS_1$) is supplied to the reset transistor 202, a second timing signal ($TS_2$) is supplied to the control transistor 204 and the switching element 208 of the start-up circuit 104, and a fourth timing signal ($TS_4$) is supplied to the switching element 304 of the primary circuit 102. A pulse in a timing signal is intended to represent an increase in voltage applied via the timing signal. Accordingly, during the pulse, a HIGH voltage is applied to the one or more electrical elements to which the timing signal is supplied and during other intervals, a LOW voltage is applied to the one or more electrical elements.

Figure 3:
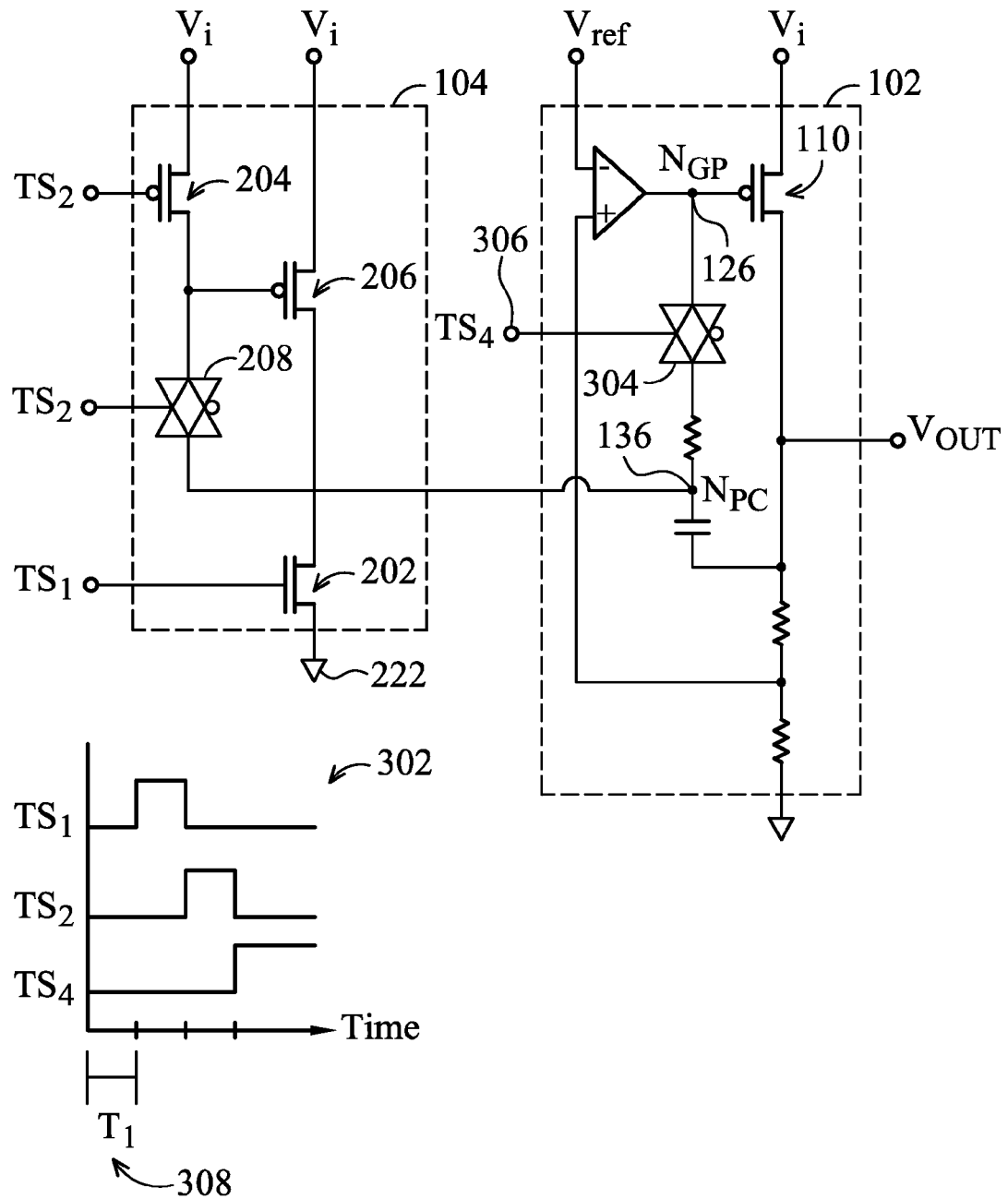
FIG. 3 is a diagram illustrating an example system for regulating a voltage applied to a load during a first interval of time.

Turning to FIG. 3, a state of the start-up circuit 104 and the primary circuit 102 during standby or sleep-mode is shown, such as during the time interval labeled $T_1$ 308 in the timing diagram 302. During this interval, the voltage applied by respective time signals, $TS_1$, $TS_2$, and $TS_4$, is a LOW voltage, which causes the n-type reset transistor 202, the switching element 208 of the start-up circuit, and the switching element 304 of the primary circuit to be turned-off. The p-type control transistor 204 is turned-on by the LOW voltage $TS_2$, and thus a voltage, substantially equal to the input voltage ($V_i$) minus a threshold voltage ($V_{th3}$) of the control transistor 204, is applied to the gate of the p-type recharge transistor 206, causing the recharge transistor 206 to be turned-off.

Figure 4:
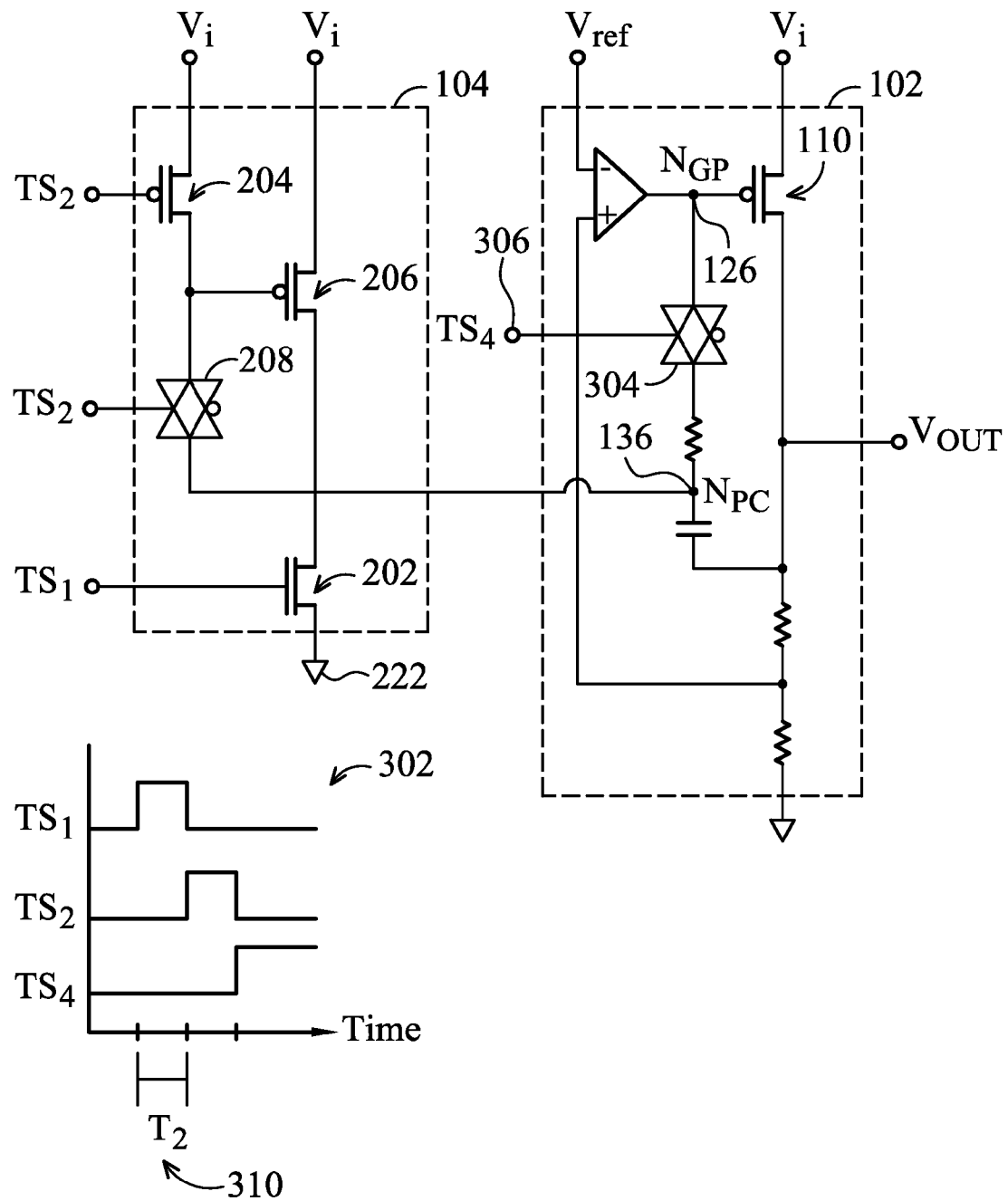
FIG. 4 is a diagram illustrating an example system for regulating a voltage applied to a load during a second interval of time.

Turning to FIG. 4, a state of the start-up circuit 104 and the primary circuit 102 during a first portion of a pre-charge operation, such as during the time interval labeled $T_2$ 310 is shown. Typically, the pre-charge operation is performed while the primary circuit 102 remains in a power-off state. By way of example, a controller indicates to the timing component 106 a desire to power-on the primary circuit momentarily, invoking the timing component 106 to initiate a pre-charge operation.

During a first portion of the pre-charge operation, the timing component 106 is configured to alter the first timing signal ($TS_1$) to increase a voltage applied to the n-type reset transistor 202. Such an increase in voltage is configured to turn-on the reset transistor 202 to electrically couple to pre-charge node 136 to ground 222 or to a voltage source configured to discharge or reset the pre-charge node 136. In this way, voltage that has accumulated at the pre-charge node 136 during standby or that has remained at the pre-charge node 136 since the primary circuit 102 was powered-down is discharged. The second timing signal (TS$_2$) and the fourth timing signal (TS$_4$) remain in a LOW voltage state, and thus the control transistor 204 remains turned-on while the recharge transistor 206, switching element 208, and the switching element 304 remain turned-off. Accordingly, during the first portion of the pre-charge operation, the pre-charge node 136 remains electrically decoupled from the gate-point node 126 and the recharge transistor 206 is not applying a voltage to the pre-charge node 136.

Figure 5:
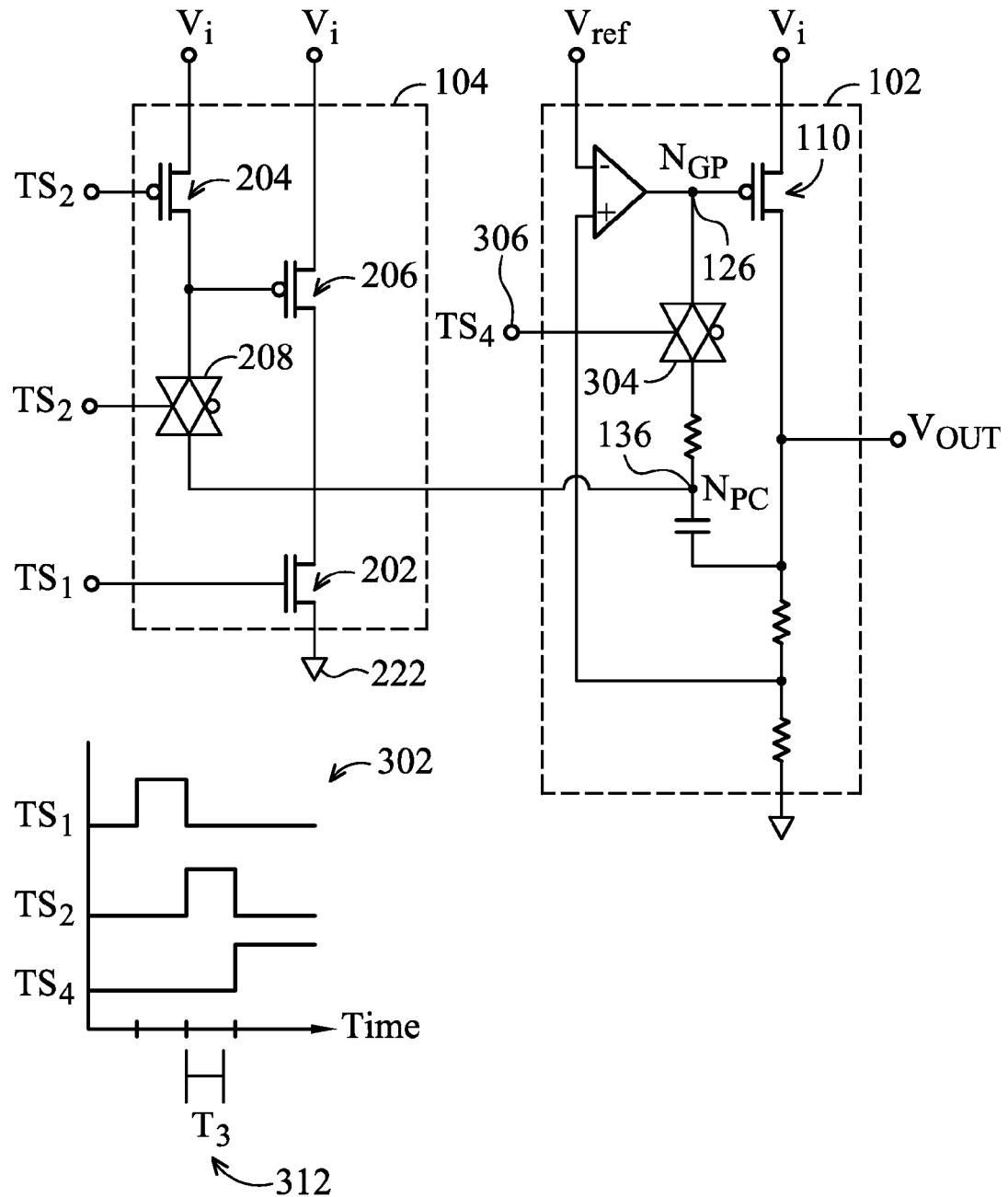
FIG. 5 is a diagram illustrating an example system for regulating a voltage applied to a load during a third interval of time.

Turning to FIG. 5, a state of the start-up circuit 104 and the primary circuit 102 during a first part of the second portion of a pre-charge operation, such as during the time interval labeled T$_3$ 312, is shown. During this time interval, the timing component 106 is configured to alter the first timing signal (TS$_1$), such that a LOW voltage is reapplied to the n-type reset transistor 202 to turn-off the reset transistor 202. In this way, the pre-charge node 136 is electrically decoupled from ground 222 or from a voltage source configured to discharge or reset the pre-charge node 136. Moreover, the timing component 106 is configured to alter the second timing signal (TS$_2$) such that a HIGH voltage is applied to the control transistor 204 and to the switching element 208 of the start-up circuit 104. Such a change in voltage is configured to deactivate the p-type control transistor 204, causing a voltage to no longer be applied to the gate of the recharge transistor 206 by the control transistor 204. The voltage change is also configured to turn-on the switching element 208, which causes the pre-charge node 136 to be electrically coupled to the gate of the recharge transistor 206. Due to the control transistor 204 being turned-off and the voltage of the pre-charge node 136 being substantially zero, the p-type recharge transistor 206 turns-on during the time interval labeled T$_3$. In some embodiments, the recharge transistor 206 behaves as a diode when turned-on.

While the recharge transistor 206 is turned-on, the recharge transistor 206 applies a voltage to the pre-charge node 136, which gradually charges the pre-charge node to a specified voltage. In some embodiments, the specified voltage is substantially equal to the input voltage (V$_i$) minus a threshold voltage (V$_{th2}$) of the recharge transistor 206. When the pre-charge node 136 is charged to the specified voltage, the voltage of the pre-charge node 136, which is also applied to the gate of the recharge transistor 206 via the switching element 208, causes the recharge transistor 206 to turn-off.

Figure 6:
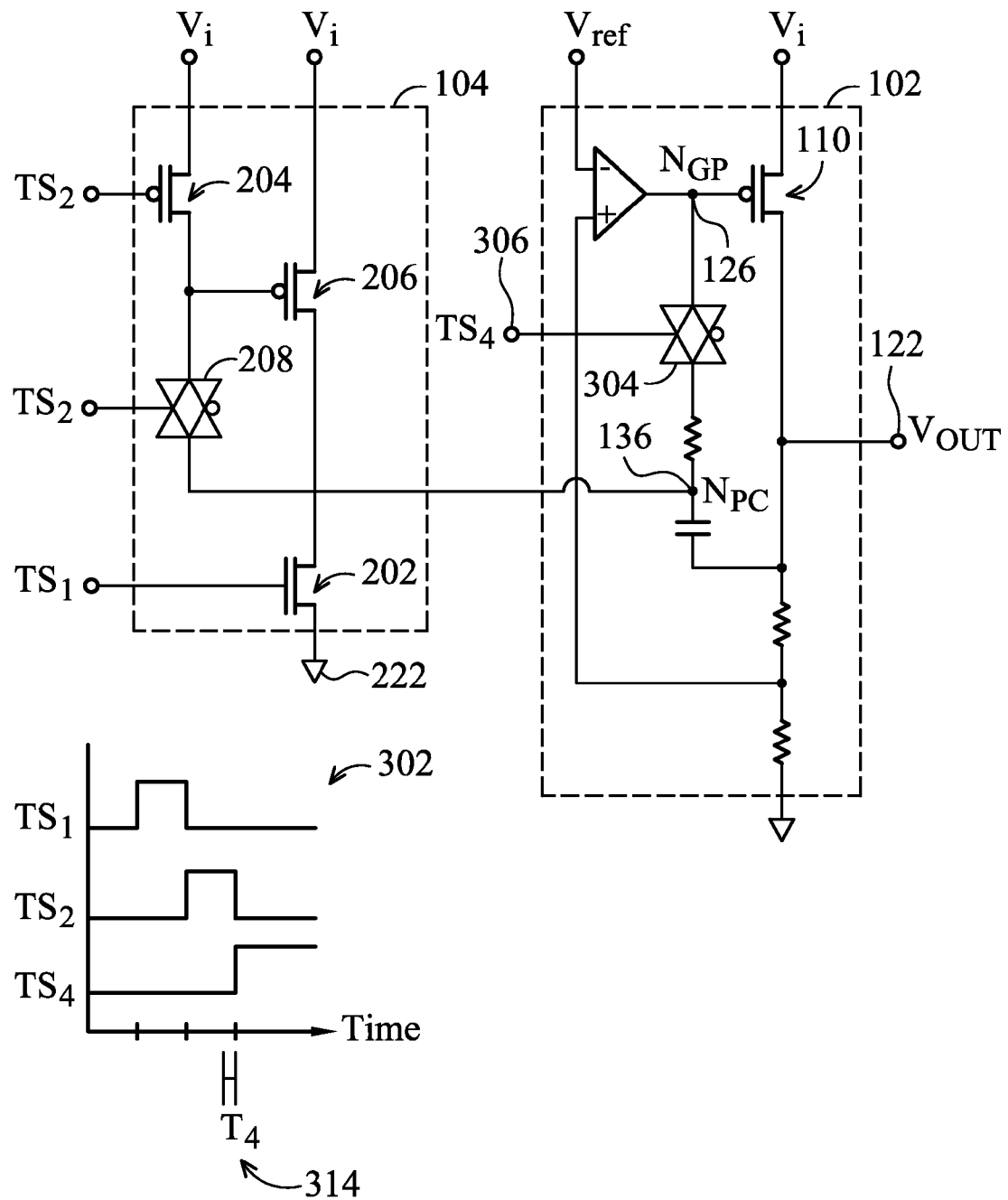
FIG. 6 is a diagram illustrating an example system for regulating a voltage applied to a load during a fourth interval of time.

According, as illustrated in FIG. 6, during a second part of the second portion of the pre-charge operation, such as during the time interval labeled T$_4$ 314, the recharge transistor 206 is turned-off without adjusting the timing signals relative to the timing signals applied during the first part of the second portion as illustrated by T$_3$ 312. That is, stated differently, the voltage of the pre-charge node 136, which remains electrically coupled to the gate of the recharge transistor 206 due to the turned-on state of the switching element 208, causes the recharge transistor 206 to turn-off. Accordingly, in some embodiments, by the end of the second portion of the pre-charge operation, the pre-charge node 136 is pre-charged to the specified voltage, which facilitates charging/discharging the capacitor 132 more quickly when the primary circuit 102 is powered-on and thus decreases a wake-up time of the primary circuit 102.

Figure 7:
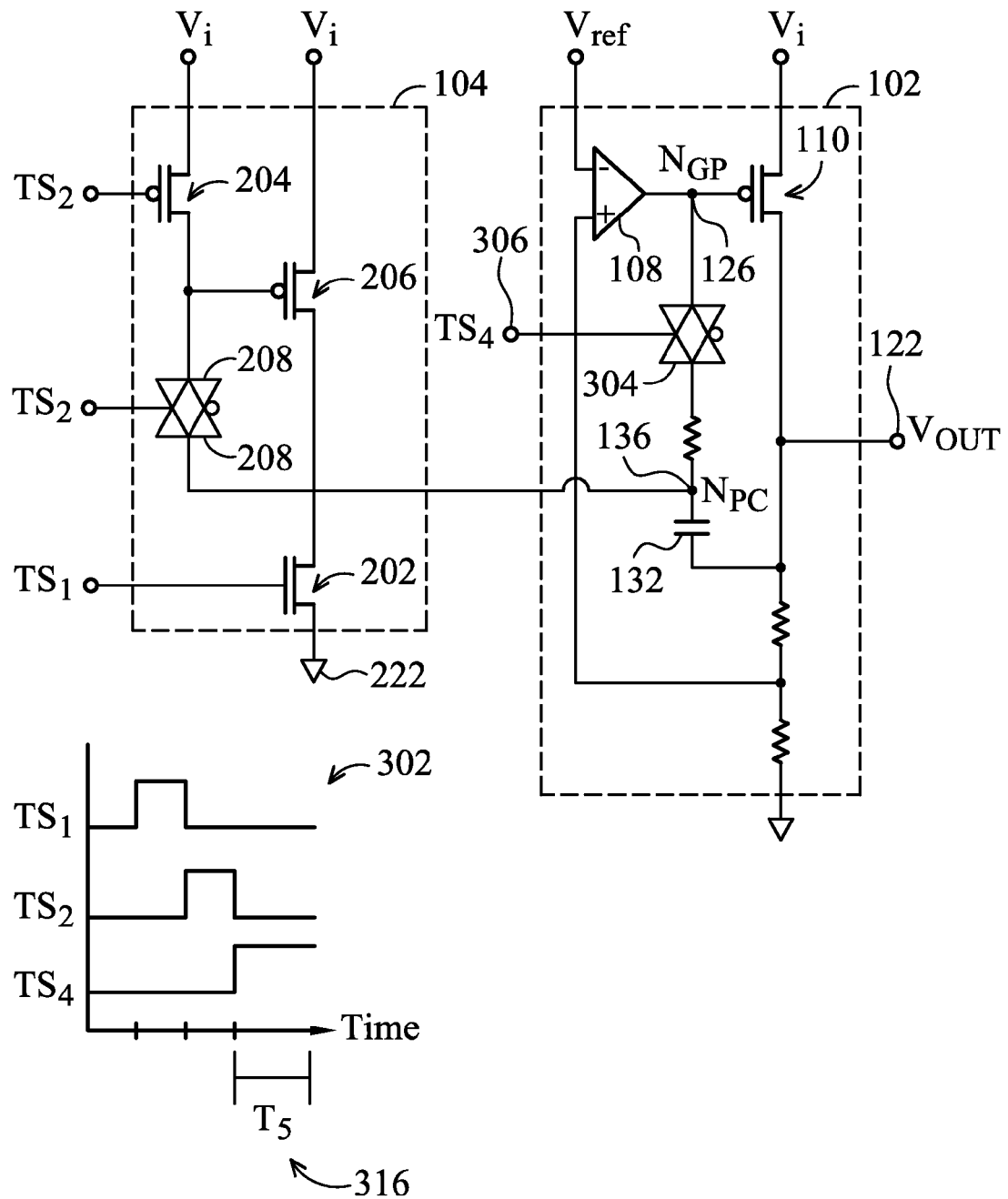
FIG. 7 is a diagram illustrating an example system for regulating a voltage applied to a load during a fifth interval of time.

Turning to FIG. 7, a state of the start-up circuit 104 and the primary circuit 102 when the pre-charge operation is complete and the primary circuit 102 is powered-on, such as during the time interval labeled T$_5$ 316, is shown. During this time interval, the timing component 106 is configured to alter the second timing signal (TS$_2$), such that a LOW voltage is reapplied to the control transistor 204 and switching element 208. Accordingly, the control transistor 204 is turned-on to facilitate applying a voltage the gate of the recharge transistor 206 which maintains the recharge transistor 206 in a turned-off state. Further, the switching element 208 is turned-off to electrically decouple the pre-charge node 136 from the gate of the recharge transistor 206. The first timing signal (TS$_1$) continues to apply a LOW voltage to the reset transistor 202 to also electrically decouple the pre-charge node 136 from ground 222.

During the timing interval labeled T$_5$ 316, the timing component 106 is also configured to alter the fourth timing signal (TS$_4$), such that a HIGH voltage is applied to the switching element 304 of the primary circuit 102 to electrically couple the pre-charge node 136 to the gate-point node 126. Further, the operational amplifier 108 is turned-on, and after the capacitor 132 is charged/discharged to a desired level, the drive transistor 110 is turned-on to regulate a voltage output from the output node 122 of the primary circuit 102. Typically, while the primary circuit 102 is powered-on, the start-up circuit 104 remains in a state illustrated in FIG. 7.

Figure 8:
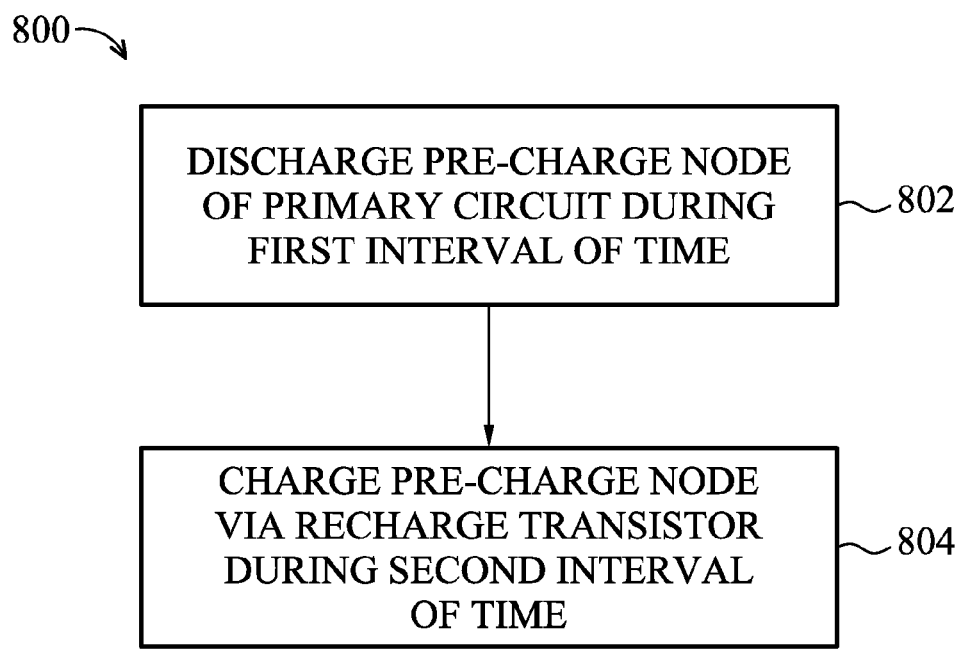
FIG. 8 is a flow chart diagram illustrating an example method for preparing a primary circuit to wake-up via a start-up circuit.

Referring to FIG. 8, a method 800 for preparing a primary circuit to wake-up via a pre-charge operation using a start-up circuit is provided. More particularly, an example method 800 for pre-charging a pre-charge node of the primary circuit to a specified voltage is provided. In some embodiments, the specified voltage is substantially equal to a switching threshold of a drive transistor or other switching element of the primary circuit, where the switching threshold defines a voltage at which the drive transistor switches from being turned-off to being turned-on. For example, the pre-charge node comprises a node positioned between a resistor and a capacitor of an RC circuit of the primary circuit and is pre-charged to the specified voltage to facilitate charging or discharging the capacitor when the primary circuit is powered-on.

At 802 in the example method 800, the pre-charge node of the primary circuit is discharged during a first interval of time. The first interval of time is typically an interval of time during which the primary circuit is powered-off. By way of example, in some embodiments, the primary circuit enters a standby or sleep-mode. When a request to prepare the primary circuit to power-on is received, a start-up circuit or a timing component operably coupled to the start-up circuit initiates a pre-charge operation. During a first portion of the pre-charge operation, the pre-charge node of the primary circuit is discharged.

In some embodiments, the pre-charge node is selectively, electrically coupled to ground or to a voltage source via a reset transistor or other switching element. At times when the reset transistor or other switching element is turned-on, to create a short circuit, the pre-charge node is reset or discharged to reduce a voltage of the pre-charge node to substantially zero. At times when the reset transistor or other switching element is turned-off, to create an open circuit, the pre-charge node is electrically decoupled from ground or from the voltage source. Accordingly, in some embodiments, the pre-charge node is discharged at 802 by turning-on a reset transistor or other switching element to cause the pre-charge node to be electrically coupled to ground or to a voltage source.

At 804 in the example method 800, the pre-charge node is charged, or re-charged, during a second interval of time. By way of example, the pre-charge node is charged during a second portion of the pre-charge operation. Typically, during the second interval of time, the reset transistor or other switching element configured to selectively, electrically couple the pre-charge node to ground or to the voltage source is turned-off. Accordingly, during the second interval of time, the pre-charge node is no longer being discharged or reset.

Typically, the pre-charge node is selectively, electrically coupled to a second voltage source via a recharge transistor or other switching element. At times when the recharge transistor or other switching element is turned-on, to create a short circuit, the pre-charge node is electrically coupled to the second voltage source to apply a voltage to the pre-charge node and charge the pre-charge node. At times when the recharge transistor or other switching element is turned-off, to create an open circuit, the pre-charge node is electrically decoupled from the second voltage source. Accordingly, in some embodiments, the pre-charge node is charged at 804 by turning-on the recharge transistor or other switching element to facilitate application of a voltage to the pre-charge node.

The pre-charge node is charged to a specified voltage. When the pre-charge node is charged to the specified voltage, the recharge transistor or other switching element is configured to turn-off, thus electrically decoupling the pre-charge node from the second voltage source. In some embodiments, the specified voltage is substantially equal to a switching voltage of a drive transistor of the primary-circuit, the switching voltage generally being a voltage at which the drive transistor switches from being turned-off to being turned-on.

As an example, the switching voltage is equal to a voltage applied to a drain of the drive transistor minus a threshold voltage of the drive transistor, such as $V_i-V_{th1}$. Accordingly, in such an example, the specified voltage applied to the pre-charge node via the recharge transistor or other switching element is approximately $V_i-V_{th1}$. In some embodiments, to apply such a voltage via the recharge transistor, a voltage substantially equivalent to $V_i$ is applied to a drain of the recharge transistor and the recharge transistor is configured substantially similarly to the drive transistor such that the threshold voltage of the recharge transistor ($V_{th2}$) is substantially equivalent to $V_{th1}$, the threshold voltage of the drive transistor. Accordingly, the pre-charge node is charged to $V_i-V_{th2}$, where $V_{th2}$ is substantially equal to $V_{th1}$. In other embodiments, the recharge transistor may have a threshold voltage that is different than a threshold voltage of the drive transistor and thus voltage applied to the recharge transistor may be varied relative to the voltage applied to the drive transistor to compensate for the difference in threshold voltage and to charge the pre-charge node to the specified voltage.

Upon the pre-charge node being charged to the specified voltage, the pre-charge operation is complete and the primary circuit is powered-on to wake-up the primary circuit.

According to an aspect of the instant disclosure, a start-up circuit configured to apply a voltage to a pre-charge node of a primary circuit to alter a wake-up time of the primary circuit is provided. The start-up circuit comprises a reset transistor coupled to at least one of ground or a first voltage source and configured to discharge the pre-charge node when the reset transistor is turned-on. The start-up circuit also comprises a recharge transistor coupled to a second voltage source and configured to apply a first voltage to the pre-charge node when the recharge transistor is turned-on.

According to another aspect of the instant disclosure, a method for preparing a primary circuit to wake-up via a start-up circuit is provided. The method comprises discharging a pre-charge node of the primary circuit during a first interval of time. The method also comprises charging the pre-charge node via a recharge transistor during a second interval of time. The pre-charge node is charged to a specified voltage that is approximately equal to a switching voltage at which a drive transistor of the primary circuit turns-on.

According to yet another aspect of the instant disclosure, a system is provided. The system comprises a primary circuit configured to output a substantially constant voltage. The primary circuit comprises a drive transistor coupled between a first voltage source and an output terminal and an operational amplifier configured to generate an output that is applied to a gate of the drive transistor to control operation of the drive transistor. The system also comprises a start-up circuit comprising a reset transistor coupled to at least one of ground or a second voltage source and configured to discharge the pre-charge node to at least one of ground or the second voltage source when the reset transistor is turned-on. The start-up circuit also comprises a recharge transistor configured to apply a voltage to the pre-charge node when the recharge transistor is turned-on to alter a wake-up time of the primary circuit.

Figure 9:
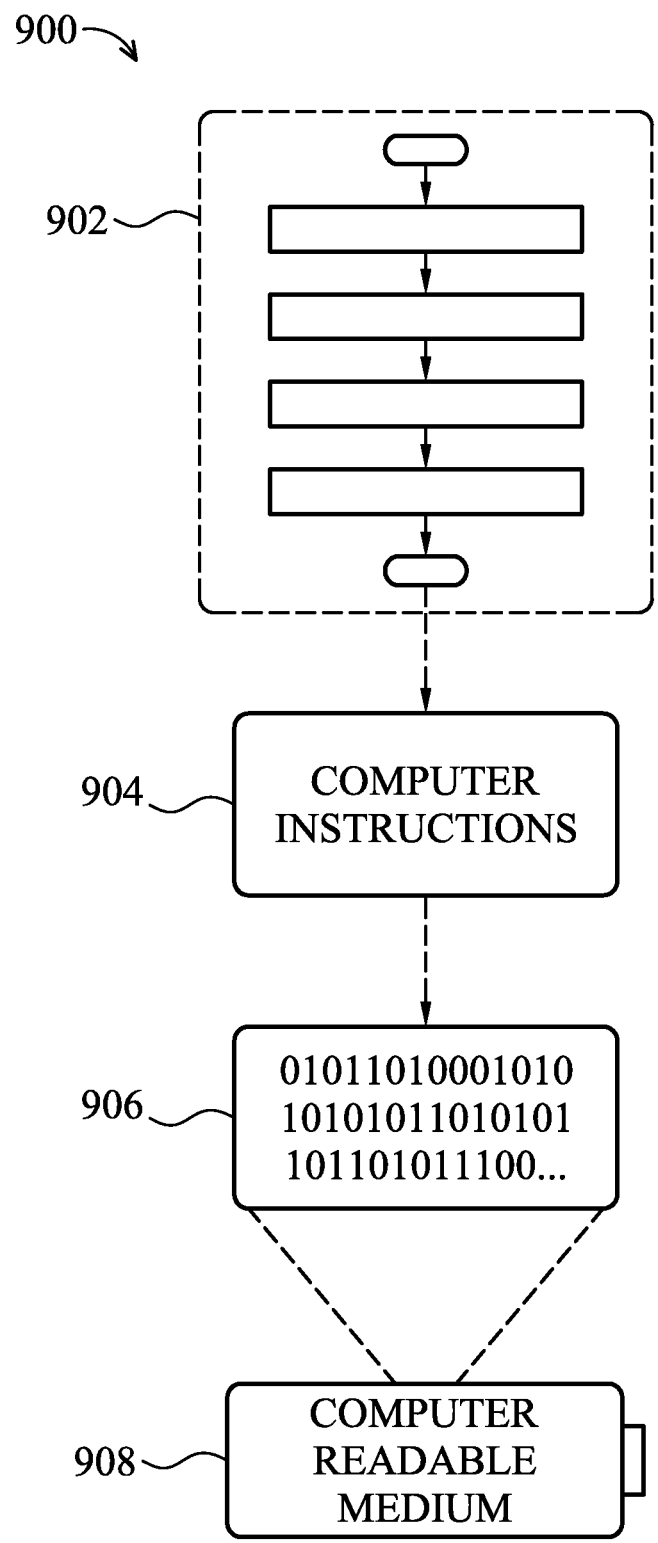
FIG. 9 is a diagram illustrating an example computer-readable medium, device, or memory comprising processor-executable instructions configured to embody one or more of the provisions set forth herein, according to some embodiments.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein an implementation 900 comprises a computer-readable medium 908, such as a CD-R, DVD-R, flash drive, a platter of a hard disk drive, etc., on which is encoded computer-readable data 906. This computer-readable data 906, such as binary data comprising a plurality of zero's and one's as shown in 906, in turn comprises a set of computer instructions 904 configured to operate according to one or more of the principles set forth herein. In the illustrated embodiment 900, the processor-executable computer instructions 904 are configured to perform a method 902, such as at least some of the exemplary method 800 of FIG. 8, for example. In other embodiments, the processor-executable computer instructions 904 are configured to implement a system such as at least some of the exemplary system 100, the primary circuit 102, the start-up circuit 104, or the timing component 106 of illustrated in FIG. 1, 2, 3, 4, 5, 6, or 7. Many such computer-readable media are devised by those of ordinary skill in the art that are configured to operate in accordance with the techniques presented herein.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

It will be appreciated that layers, features, elements, etc. depicted herein are illustrated with particular dimensions relative to one another, such as structural dimensions and/or orientations, for example, for purposes of simplicity and ease of understanding and that actual dimensions of the same differ substantially from that illustrated herein, in some embodiments. Additionally, a variety of techniques exist for forming the layers, features, elements, etc. mentioned herein, such as implanting techniques, doping techniques, spin-on techniques, sputtering techniques such as magnetron or ion beam sputtering, growth techniques, such as thermal growth and/or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to "channel A" and "channel B," where channel A and channel B are two different channels, two identical channels, or the same channel.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A start-up circuit configured to apply a voltage to a pre-charge node of a primary circuit to alter a wake-up time of the primary circuit, comprising:
    a reset transistor coupled to at least one of ground or a first voltage source and configured to discharge the pre-charge node to at least one of ground or the first voltage source when the reset transistor is turned-on;
    a recharge transistor coupled to a second voltage source and configured to apply the voltage to the pre-charge node when the recharge transistor is turned-on; and
    a control transistor coupled to a third voltage source and configured to control application of a second voltage to a gate of the recharge transistor.

2. The start-up circuit of claim 1, comprising a switching element configured to selectively couple the gate of the recharge transistor to the pre-charge node.

3. The start-up circuit of claim 1, the second voltage source different than the third voltage source.

4. The start-up circuit of claim 1, comprising a switching element coupled to the pre-charge node and to the control transistor.

5. The start-up circuit of claim 4, the switching element configured to inhibit the second voltage from being applied to the pre-charge node.

6. The start-up circuit of claim 4, the switching element configured to facilitate applying the voltage to the gate of the recharge transistor.

7. The start-up circuit of claim 4, the switching element configured to be turned-on concurrently with the control transistor being turned-off.

8. The start-up circuit of claim 1, the primary circuit comprising at least one of a voltage regulator or a bandgap voltage reference.

9. The start-up circuit of claim 1, the recharge transistor configured to turn-off when the pre-charge node is charged to a specified voltage.

10. The start-up circuit of claim 1, comprising a switching element configured to couple the gate of the recharge transistor to the pre-charge node when the recharge transistor is turned-on.

11. A method for preparing a primary circuit to wake-up via a start-up circuit, comprising:
    during a first portion of a pre-charge operation:
        discharging a pre-charge node of the primary circuit; and
    during a second portion of the pre-charge operation:
        activating a switch disposed between the pre-charge node and a gate of a recharge transistor to couple the pre-charge node to the gate of the recharge transistor to turn-on the recharge transistor, wherein the recharge transistor applies a voltage to the pre-charge node while the recharge transistor is turned-on to charge the pre-charge node to a specified voltage.

12. The method of claim 11, the discharging comprising:
    turning-on a reset transistor coupled between the pre-charge node and at least one of ground or a first voltage source to discharge the pre-charge node to at least one of ground or the first voltage source.

13. The method of claim 11, the recharge transistor directly coupled to the pre-charge node to which the voltage is applied.

14. The method of claim 11, wherein the voltage applied to the pre-charge node turns off the recharge transistor when the pre-charge node is charged to the specified voltage.

15. A system comprising:
    a primary circuit configured to output a substantially constant voltage and comprising:
        a drive transistor coupled between a first voltage source and an output terminal;
        an operational amplifier configured to generate an output that is applied to a gate of the drive transistor to control operation of the drive transistor;
        a resistor-capacitor (RC) circuit; and
        a switching element coupled between the RC circuit and a gate-point node situated between the operational amplifier and the drive transistor; and
    a start-up circuit comprising:
        a reset transistor coupled to at least one of ground or a second voltage source and configured to discharge a pre-charge node, located between a resistor and a capacitor of the RC circuit, to at least one of ground or the second voltage source when the reset transistor is turned-on; and
        a recharge transistor configured to apply a voltage to the pre-charge node when the recharge transistor is turned-on to alter a wake-up time of the primary circuit, wherein the switching element is configured to electrically decouple the gate-point node from the pre-charge node while the start-up circuit is applying the voltage to the pre-charge node.

16. The system of claim 15, the primary circuit comprising at least one of a voltage regulator or a bandgap voltage reference.

17. The system of claim 15, a gate of the recharge transistor electrically coupled to the pre-charge node during at least a portion of a time when the recharge transistor is turned-on and electrically decoupled from the pre-charge node during at least a portion of a time when the recharge transistor is turned-off.

18. The system of claim 15, comprising a control transistor coupled to a third voltage source and configured to control application of a second voltage to a gate of the recharge transistor.

19. The system of claim 18, the third voltage source different than the first voltage source.

20. The system of claim 18, comprising a second switching element coupled to the pre-charge node and to the control transistor.

\* \* \* \* \*